(12) United States Patent
Mizutani et al.

(10) Patent No.: US 7,160,415 B2
(45) Date of Patent: Jan. 9, 2007

(54) GEL ELECTROLYTE BATTERY

(75) Inventors: Toru Mizutani, Fukushima (JP);
Tsuyoshi Sugiyama, Fukushima (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 10/727,468

(22) Filed: Dec. 4, 2003

(65) Prior Publication Data

US 2005/0000086 A1  Jan. 6, 2005

Related U.S. Application Data

(62) Division of application No. 09/768,093, filed on Jan. 23, 2001, now Pat. No. 6,755,873.

(30) Foreign Application Priority Data

Mar. 17, 2000 (JP) ............................ P2000-081860

(51) Int. Cl.
*H01M 2/00* (2006.01)
(52) U.S. Cl. ................... 156/308.4; 429/162; 429/163; 429/185; 429/300; 29/623.2; 29/623.4
(58) Field of Classification Search ................ 429/162, 429/163, 185, 300; 156/308.4, 309.6, 583.3; 29/623.2, 623.4
See application file for complete search history.

(56) References Cited

U.S. PATENT DOCUMENTS

| 4,069,578 | A | * | 1/1978 | Kinsman .................... 29/623.3 |
| 5,116,440 | A | * | 5/1992 | Takeguchi et al. ............. 156/90 |
| 5,658,686 | A | * | 8/1997 | Akashi ........................ 429/303 |
| 5,871,865 | A | * | 2/1999 | Barker et al. ................ 429/223 |
| 5,972,140 | A | * | 10/1999 | Hass et al. ................ 156/89.11 |
| 6,022,642 | A | * | 2/2000 | Tsukamoto et al. .......... 429/312 |
| 6,399,241 | B1 | | 6/2002 | Hara et al. |
| 6,428,934 | B1 | | 8/2002 | Hatazawa et al. |
| 6,632,538 | B1 | * | 10/2003 | Yamazaki et al. ........... 428/461 |
| 6,797,430 | B1 | * | 9/2004 | Hatta et al. ................. 429/181 |

FOREIGN PATENT DOCUMENTS

| JP | 01320769 A | * | 12/1989 |
| JP | 11140209 A | * | 5/1999 |

OTHER PUBLICATIONS

WO 99/40634.*
English abstract for JP 11140209.*
Abstract for JP01320769.*

* cited by examiner

*Primary Examiner*—Jeff H. Aftergut
*Assistant Examiner*—John L. Goff
(74) *Attorney, Agent, or Firm*—Sonnenschein Nath & Rosenthal LLP

(57) ABSTRACT

A gel electrolyte battery in which adhesion between a layer of an active material of an electrode and a gel electrolyte is raised to provide for sufficient mobility of lithium ions, and a method for the preparation of the gel electrolyte battery. The gel electrolyte battery is comprised of a battery device accommodated in an exterior material of a laminated film and sealed in it on heat fusion. The method for the preparation of the gel electrolyte battery includes a battery device preparation step of layering a positive electrode and a negative electrode via a gel electrolyte to form the battery device, an accommodating step of accommodating the battery device from the battery device preparation step in the laminated film, and a heating step of heating the battery device, accommodated in the laminated film in the accommodating step, under a pressured state.

12 Claims, 5 Drawing Sheets

GEL ELECTROLYTE BATTERY

RELATED APPLICATION DATA

The present application claims priority to Japanese Application No. P2000-081860 filed Mar. 17, 2000, and is a divisional of U.S. application Ser. No. 09/768,093, filed Jan. 23, 2001 now U.S. Pat. No. 6,755,873, both of which are incorporated herein by reference to the extent permitted by law.

BACKGROUND OF THE INVENTION

1. Field of the Invention

This invention relates to a gel electrolyte battery having a gel electrolyte.

2. Description of Related Art

As a power source for a portable electronic equipment, such as a portable telephone set, a video camera or a notebook personal computer, the importance attached to batteries is increasing. For reducing the size and weight of the electronic equipment, such a battery is desired which not only is of a large capacity but also is lightweight and space-saving. Viewed in this light, a lithium battery, having a high energy density and high output density, is suited very much. A lithium battery, employing a carbon material as a negative electrode material, has an average discharge voltage of not lower than 3.7 V and undergoes lesser cyclic deterioration during charging/discharging, so that it has a merit that a high energy density can readily be realized.

The lithium battery is desired to exhibit flexibility and shape freedom, and lithium batteries of various shapes, such as a sheet battery of thin thickness and large area, or a card battery of a thin thickness and a small area, are also desired. However, in the conventional technique of enclosing a battery device comprised of positive and negative electrodes and an electrolytic solution within an exterior metallic can, it is difficult to fabricate batteries of variable shapes such as those depicted above. Moreover, the use of the electrolytic solution tends to complicate the manufacturing process or renders it necessary to provide leakage-resistant means.

For overcoming the above-mentioned problems, such battery is being envisaged which uses a solid electrolyte employing an electrically conductive organic high polymer material or organic ceramics, or a gelated solid electrolyte having an electrolytic solution impregnated into a matrix polymer, referred to below as a gel electrolyte. With the solid electrolyte battery, employing the solid electrolyte, or with the gel electrolyte battery, employing the gel electrolyte, in which the electrolyte is immobilized, it is possible to fabricate the battery using a film-shaped exterior material to a reduced thickness, thus providing a higher energy density than is possible with the conventional battery.

However, the gel electrolyte battery has a deficiency that, since the electrolytic solution is held in the matrix polymer, the electrolytic solution cannot sufficiently seep into the layer of the active materials of the electrodes. As a result, lithium ions cannot be migrated sufficiently across the electrodes, with the result that a desired battery capacity cannot be achieved.

Moreover, in a gel electrolyte battery, the solvent in the gel electrolyte tends to be decomposed at the time of activation charging to evolve gases, with the result that local gaps are produced between the layer of the active material and the gel electrolyte to impair the adhesion between the layers of the active materials of the electrodes and the gel electrolyte. If such gap is produced between the layer of the active material and the gel electrolyte, the battery in storage is deteriorated appreciably in battery voltage to prove a reject to lower the production yield. Moreover, lithium ion migration across the electrodes is retarded to render it extremely difficult to realize the desired battery capacity.

SUMMARY OF THE INVENTION

It is therefore an object of the present invention to provide a method for the preparation of a non-aqueous electrolyte battery in which adhesion between the layers of the active materials of the electrodes and the gel electrolyte is improved and kept to prevent voltage troubles from occurring to improve the production yield to enable the fabrication of a non-aqueous electrolyte battery having a high battery capacity.

In one aspect, the present invention provides a method for preparation of a gel electrolyte battery in which a battery device is accommodated in an exterior material of a laminated film and sealed therein by heat fusion, in which the method includes a battery device preparation step of layering a positive electrode and a negative electrode via a gel electrolyte to form the battery device, an accommodating step of accommodating the battery device from the battery device preparation step in the laminated film and a heating step of heating the battery device, accommodated in the laminated film in the accommodating step, under a pressured state.

In another aspect, the present invention provides a method for preparation of a gel electrolyte battery in which a battery device is accommodated in an exterior material of a laminated film and sealed therein by heat fusion, in which the method includes a battery device preparation step of layering a positive electrode and a negative electrode via a gel electrolyte to form the battery device, an accommodating step of accommodating the battery device from the battery device preparation step in the laminated film, a charging step of charging the battery device accommodated in the laminated film in the accommodating step, a discharging step of discharging the battery device following the charging step and a heating step of heating the battery device from the discharging step under a pressured state.

According to the present invention, the seeping of a gel electrolyte into the electrode is accelerated by applying pressuring and heating to a battery device provided with the gel electrolyte. Since the pressuring and heating are applied to the battery device, the adhesion between the gel electrolyte layer and a layer of the active material of the electrode is restored to improve the production yield, even if a gap is produced between the layer of the active material of the electrode and the gel electrolyte due to gases evolved in activation charging. As a result, the adhesion between the layer of the active material of the electrode and the gel electrolyte is improved to provide a gel electrolyte battery having a high capacity and superior charging/discharging characteristics and operational reliability.

DESCRIPTION OF THE PREFERRED EMBODIMENTS

Figure 1:
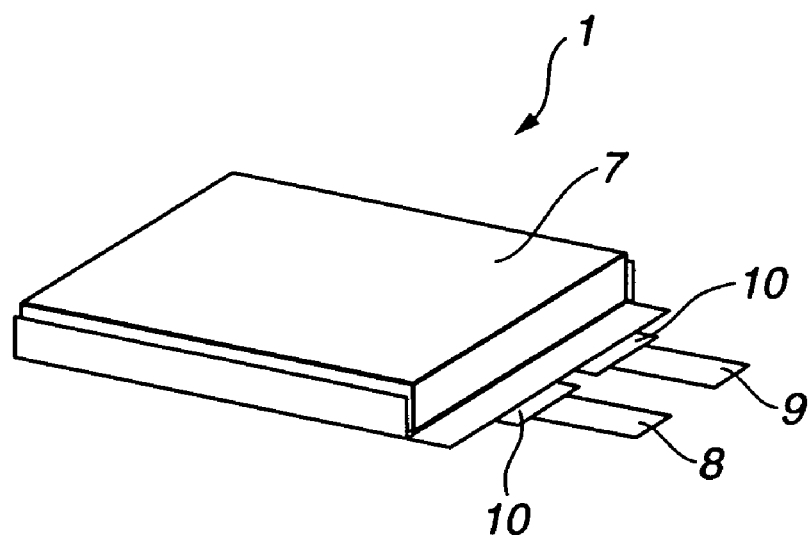
FIG. 1 is a perspective view showing an illustrative structure of a gel electrolyte battery according to the present invention.

Referring to the drawings, preferred embodiments of the present invention will be explained in detail.

Figure 2:
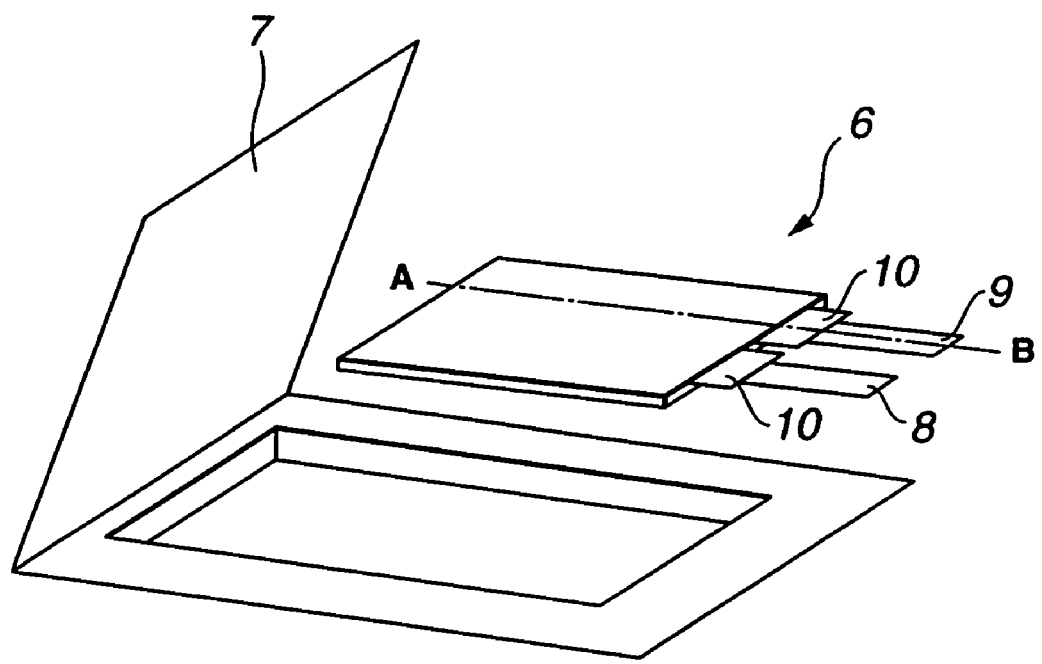
FIG. 2 is a perspective view showing a battery device as it is accommodated in an exterior film.
Figure 3:
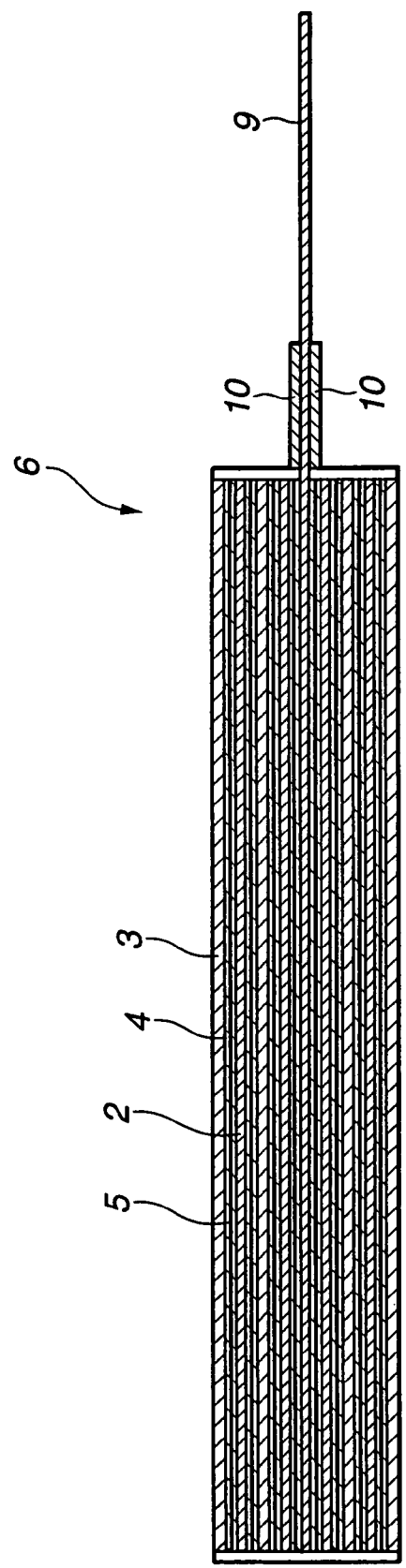
FIG. 3 is a cross-sectional view taken along line A–B in FIG. 2.

FIGS. 1 to 3 show an illustrative structure of a gel electrolyte battery prepared in accordance with the present invention. Referring to FIG. 3, this gel electrolyte battery 1 includes a band-shaped positive electrode 2, a band-shaped negative electrode 3 mounted facing the positive electrode 2, a gel electrolyte layer 4 formed on the positive electrode 2 and the negative electrode 3, and a separator 5 arranged between the positive electrode 2 carrying the gel electrolyte layer 4 and the negative electrode 3 carrying the gel electrolyte layer 4.

In this gel electrolyte battery 1, the positive electrode 2 carrying the gel electrolyte layer 4, and the negative electrode 3 carrying the gel electrolyte layer 4, are layered together with interposition of the separator 5, and are coiled in the longitudinal direction to form a battery device 6, as shown in FIGS. 2 and 3. The battery device 6 so formed is hermetically sealed by an exterior film 7 of an insulating material. To the positive electrode 2 and the negative electrode 3 are connected a positive electrode terminal 8 and a negative electrode terminal 9, respectively, these terminals 8, 9 being fitted in an opening formed in a rim of an exterior film 7. A resin film 10 is arranged in an area of contact of the terminals 8, 9 with the exterior film 7.

Figure 4:
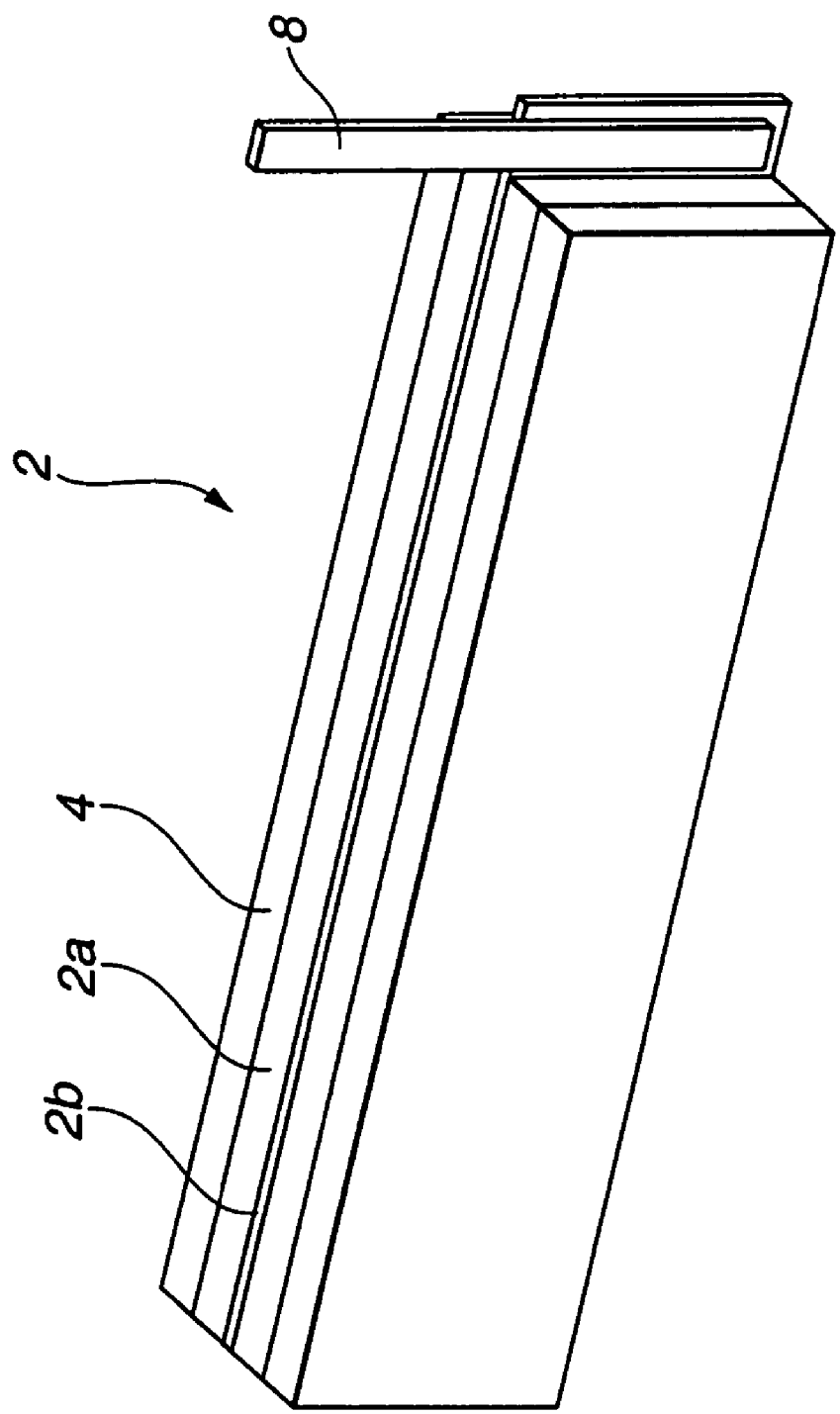
FIG. 4 is a perspective view showing the structure of a positive electrode.

In the positive electrode 2, a positive active material layer 2a, containing a positive active material is formed on each surface of the positive electrode collector 2b, as shown in FIG. 4. It is noted that the state in which the gel electrolyte layer 4 is formed on the positive active material layer 2a is shown in FIG. 4.

As this positive electrode collector 2b, a metal foil, such as an Al foil, is used. This metal foil is preferably porous. By employing the porous metal foil as the positive electrode collector, it is possible to improve adhesion strength between the positive electrode collector 2b and the positive active material layer 2a. The porous metal foil used may be punching metal or expanded metal, but may also be a metal foil in which numerous openings are formed by etching.

The positive active material may be enumerated by metal oxides, metal sulfides, specified high molecular materials, or a lithium compound oxide, having the general formula of $Li_xMO_2$, depending on the type of the batteries desired to be produced. In this general formula, M denotes one or more transition metals, and x is usually such that $0.05 \leq x \leq 1.12$.

The transition metal M of the lithium compound oxide is preferably at least one of cobalt (Co), nickel (Ni) and manganese (Mn). Specified examples of the lithium compound oxides include $LiCoO_2$, $LiNiO_2$, $Li_xNi_yCo_{1-y}O_2$, where x and y differ in magnitudes depending on the charging/discharging state of the battery and usually $0<x<1$ and $0.7<y<1.0$, or $LiMn_2O_4$.

These lithium compound oxides may be prepared using, as starting materials, lithium compounds and transition metal compounds, such as carbonates, nitrates, sulfates, oxides, hydroxides or halogenides of the lithium transition metals. For example, the lithium compound oxides may be prepared by metering lithium salt and transition metal starting materials, depending on the desired composition, sufficiently mixing the materials and sintering, under heating, in an oxygen-containing atmosphere, in a temperature range of from 600° to 1000° C. There is no particular limitation to the methods of mixing the respective components, such that the pulverulent salts may be directly mixed in a dry state or may also be dissolved in water for mixing as an aqueous solution.

As a binder contained in the positive active material layer 2a, any suitable known resin material, routinely used as a binder for the positive active material layer of the non-aqueous electrolyte battery, may be used.

Figure 5:
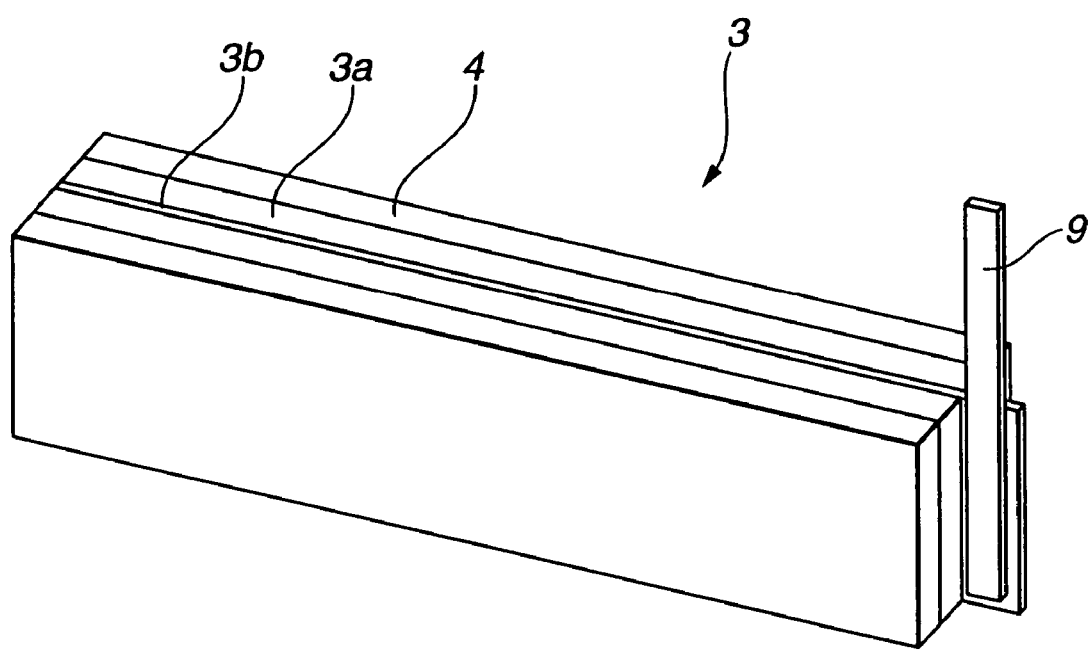
FIG. 5 is a perspective view showing the structure of a negative electrode.

In the negative electrode 3, a negative active material layer 3a, containing a negative active material, is formed on each surface of the negative electrode collector 3b, as shown in FIG. 5. It is noted that the state in which the gel electrolyte layer 4 has been formed on the negative active material layer 3a is shown in FIG. 5.

As this negative electrode collector 3b, metal foils, such as a copper or nickel foil, is used. This metal foil is preferably porous. By employing a porous metal foil as a negative electrode collector, it is possible to improve adhesion strength between the negative electrode collector 3b and the negative active material layer 3a. The porous metal foil used may be punching metal or expanded metal, but may also be a metal foil in which numerous openings are formed by etching.

As the negative active material, such materials capable of doping/undoping lithium may be used. These materials, capable of doping/undoping lithium, may be enumerated by lithium metals, lithium metal alloys and carbon materials. Examples of the carbon materials include natural or synthetic graphite, pyrolytic carbon, cokes, such as pitch coke, needle coke or petroleum coke, carbon blacks, such as acetylene black, vitreous carbon, activated charcoal, carbon fibers, sintered organic high molecular materials, such as cellulose, phenolic resins or furan resins, fired at suitable temperatures, and carbon fibers.

As binders contained in the negative active material layer 3a, any suitable known resin materials, routinely used as a binder for the negative active material layer of the non-aqueous electrolyte battery, may be used.

In the gel electrolyte layer 4, the non-aqueous electrolyte, comprised of an electrolytic salt dissolved in a non-aqueous solvent, is gelated by a matrix polymer.

As the electrolyte salt, $LiPF_6$, $LiClO_4$, $LiCF_3SO_3$, $LiAsF_6$, $LiBF_4$, $LiN(CF_3SO_3)_2$ or $C_4F_9SO_3Li$, may be used alone or in combination. Of these, $LiPF_6$ is preferred in view of ionic conductivity. Meanwhile, the electrolyte salt is preferably formulated to a concentration of 0.10 mol/l to 2.0 mol/l, based on a non-aqueous solvent, in order to give satisfactory ionic conductivity.

There is no particular limitation to the chemical structure of the matrix polymer, if the polymer per se or the gel electrolyte employing this polymer per se exhibits ionic conductivity not lower than 1 mS/cm at ambient temperature. As this matrix polymer, polyacrylonitrile, polyacrylonitrile copolymers, polyoxylene oxides or polyoxylene oxide copolymers, may be used. The vinyl copolymer monomers may be enumerated by, for example, hexafluoropropylene, tetrafluoroethylene, vinyl acetate, methyl methacrylate, butyl methacrylate, methyl acrylate, butyl acrylate, itaconic acid, hydrogenated methyl acrylate, hydrogenated ethyl acrylate, acrylic amide, vinyl chloride, vinylidene fluoride, and vinylidene chloride. In addition, acrylonitrile-butadiene rubber, acrylonitrile-butadiene styrene resin, acrylonitrile-polyethylene chloride propylene diene styrenic resin, acrylonitrile-vinyl chloride resin, acrylonitrile-methacrylate resin and acrylonitrile-acrylate resin, may also be used. Moreover, polyether modified siloxane or copolymers thereof may be used. The above-mentioned matrix polymer may be used singly or in combination.

As the non-aqueous solvent, ethylene carbonate, propylene carbonate, butylene carbonate, ã-butyrolactone, 2,4-difluoroanisole, 2,6-difluoroanisole or 4-bormovelatol, may be used singly or in combination.

If a multi-layer film, such as exterior film 7, is used as an exterior material for a battery, it is preferred to use solvents boiling at a temperature 150° C. or higher, such as ethylene carbonate, propylene carbonate, ã-butyrolactone, 2,4-difluoroanisole, 2,6-difluoroanisole or 4-bormovelatol, in combination.

Moreover, in the gel electrolyte battery, embodying the present invention, the content of the low boiling solvent in the non-aqueous solvent is set to 1 wt % or less. Meanwhile, the low boiling solvent means such a solvent boiling at 110° C. or less. If the content of the low boiling solvent exceeds 1 wt %, the low boiling solvent content is volatilized off in preparing the gel electrolyte battery by processing the battery device with heating, thereby swelling the exterior film to deform the battery shape.

Such low boiling solvent may specifically be enumerated by ã-valerolactone, diethoxyethane, tetrahydrofuran, 2-methyl tetrahydrofuran, 1,3-dioxolane, methyl acetate, methyl propionate, dimethyl carbonate, diethyl carbonate and ethyl methyl carbonate.

As the separator 5, a micro-porous thin film, mainly composed of polyolefin, such as polypropylene, polyethylene or compound materials thereof, may be used. It is more preferred to use a micro-porous thin film, improved in wettability with respect to the electrolytic solution by exploiting surfactants or corona discharge processing. This prevents the internal resistance of the battery from increasing.

Although there is no limitation to the porosity of the separator 5, it is preferred to set the porosity to 30 to 80%. If the porosity of the separator 5 is less than 30%, output characteristics of the battery are lowered significantly. If the porosity of the separator 5 exceeds 60%, the separator 5 is lowered in mechanical strength. Moreover, there is no limitation to the diameter of the pores or to the thickness of the separator 5, however, the pore diameter is preferably set to 1 µm or less to prevent internal shorting and to display shutdown effects by pore closure.

The thickness of the separator 5 is preferably on the order of 5 to 35 µm. Moreover, if the relation between the mechanical strength and the electrical resistance of the separator 5 is taken into account, the thickness of the separator 5 is preferably on the order of 7 to 20 µm.

It suffices if the exterior film 7 exhibits moisture-proofness. For example, a three-layer film comprised of a nylon film, an Al foil and a polyethylene film, layered in this order and stuck together, may be used.

In the gel electrolyte battery 1, prepared in accordance with the present invention, in which the adhesion between the gel electrolyte and the active material layers of the electrodes is improved by pressuring and heating of the battery device 6, occurrence of voltage troubles may be lowered, while the production yield is improved. Moreover, the gel electrolyte battery 1 has a high battery capacity and superior battery characteristics.

The gel electrolyte battery 1, embodying the present invention, as discussed above, is prepared in the following manner.

For preparing the positive electrode 2, powders of a positive active material, an electrifying agent, such as carbon black or graphite, and a binder, such as polyvinylidene fluoride, are mixed uniformly, and added to with a solvent, such as dimethyl formamide or n-methyl pyrrolidone, to yield a paste-like positive electrode mixture, which then is evenly coated on a metal foil, such as an Al foil, operating as the positive electrode collector 2b. The resulting assembly then is dried to form a positive electrode sheet carrying the positive active material layer 2a thereon. The above-mentioned positive electrode mixture may be added to with e.g., known additives.

On the positive active material layer 2a of the positive electrode sheet is formed the gel electrolyte layer 4. For preparing the gel electrolyte layer 4, an electrolyte salt is dissolved in the non-aqueous solvent to prepare a non-aqueous solution. To this non-aqueous solution is added a matrix polymer. The resulting mass is stirred thoroughly to dissolve the matrix polymer to produce a sol-like electrolytic solution 28.

On this positive electrode 2 is applied a pre-set amount of the electrolytic solution. The resulting mass is cooled at room temperature to permit the matrix polymer to be gelated to form the gel electrolyte layer 4 on the positive active material layer 2a.

A positive electrode sheet, carrying the gel electrolyte layer 4, is sliced in a strip shape. To a portion of the positive electrode collector 2b not carrying the positive active material layer 2a is welded a lead wire of e.g., aluminum, to yield a positive electrode terminal 8. This gives a strip-like positive electrode 2 carrying the gel electrolyte layer 4 thereon.

In preparing the negative electrode 3, powders of the negative active material and a binder such as polyvinylidene fluoride are mixed evenly and added to with a solvent such as dimethyl formaldehyde or n-methyl pyrrolidone to prepare a paste-like negative electrode mixture. This negative electrode mixture is evenly coated on a metal foil, such as copper foil or nickel foil operating as the negative electrode collector 3b, and dried to form a negative electrode sheet carrying the negative active material layer 3a thereon. This negative electrode mixture may be added to with e.g., a known additive.

On the negative electrode collector 3b of the negative electrode sheet is formed the gel electrolyte layer 4. For forming the gel electrolyte layer 4, a pre-set amount of the electrolytic solution, prepared as discussed above, is coated on the layer of the negative active material. The resulting mass is allowed to cool at room temperature to permit the matrix polymer to be gelated to form the gel electrolyte layer 4 on the negative electrode collector 3b.

A negative electrode sheet, carrying the gel electrolyte layer 4, is sliced in a strip shape. To a portion of the negative electrode collector 3b not carrying the negative active material layer 3a is welded a lead wire of e.g., nickel, to yield a negative electrode terminal 9. This gives a strip-like negative electrode 3 carrying the gel electrolyte layer 4 thereon.

The positive electrode 2 and the negative electrode 3, prepared as discussed above, are layered together, with the sides thereof carrying the gel electrolyte layers 4 facing each other, and with the separator 5 arranged between the positive electrode 2 and the negative electrode 3, to form a layered electrode assembly, which then is coiled longitudinally to form the battery device 6.

Finally, ths battery device 6 is enclosed in the exterior film 7 of an insulating material, and a resin film 10 is placed in an overlapping portion of the positive electrode terminal 8, negative electrode terminal 9 and the exterior film 7. The outer rim of the exterior film 7 is sealed, the positive electrode terminal 8 and the negative electrode terminal 9 are engaged in the sealing portion of the exterior film 7. The terminals 8, 9 are led to outside, as the battery device 6 is tightly sealed in the exterior film 7.

When the battery device 6 is packed in the exterior film 7, the resin film 10 is placed at a contacting portion of the exterior film 7, positive electrode terminal 8 and the negative electrode terminal 9 to prevent shorting of the exterior film 7 due to burrs as well as to improve the adhesion between the exterior film 7, positive electrode terminal 8 and the negative electrode terminal 9.

There is no limitation to the material of the resin film 10 if it exhibits adhesion characteristics to the positive electrode terminal 8 and to the negative electrode terminal 9. It is however preferred to use such material which is composed only of a polyolefin resin, such as polyethylene, polypropylene, modified polyethylene, modified polypropylene or copolymers thereof. The thickness of the resin film 10 is preferably 20 to 200 μm in terms of a thickness prior to thermal fusion. If the thickness of the resin film 10 is less than 20 μm, tractability is lowered. If it is thicker than 300 μm, it is permeable to water to render it difficult to keep the inside of the battery air-tight.

According to the present invention, the battery device 6, packed by the exterior film 7, is pressed from above and below, whilst the battery device 6 is subjected to heat treatment. By pressuring and heat-treating the battery device 6, packed by the exterior film 7, the non-aqueous electrolytic solution, held by the matrix polymer in the gel electrolyte, can be made to seep effectively into the active material layers. With the non-aqueous electrolytic solution seeping into the active material layers, it is possible to improve adhesion between the gel electrolyte layer 4 and the active material layers to provide the gel electrolyte battery 1 having a high capacity and superior charging/discharging characteristics.

In particular, if the positive electrode 2 carrying the gel electrolyte layer 4 and the negative electrode 3 also carrying the gel electrolyte layer 4 are superposed together with the separator 5 in-between, the electrolyte can be permeated sufficiently into the separator pores, thus intensifying the favorable effect.

In this case, the heating temperature for the battery device 6 is preferably not lower than the sol-gel transition temperature of the gel electrolyte. The reason is that fluidity is higher in the sol state than in the gel state such that the non-aqueous electrolytic solution in the gel electrolyte layer is more liable to seep into the active material layers to shorten the heating/pressuring time.

Specifically, the heating temperature for the battery device 6 is preferably 50° C. to 105° C., and more preferably 70° C. to 100° C. With the heating temperature higher than 105° C. part of the non-aqueous solvent in the gel electrolyte undergoes pyrolysis so that the desired battery capacity cannot be achieved. If the heating temperature is lower than 50° C. the non-aqueous solvent can seep into the non-aqueous electrolytic solution in the active material layers only insufficiently, while it takes much time for the non-aqueous electrolytic solution to seep into the active material layers to lower the production efficiency.

The pressure applied to the battery device 6 is preferably in a range from 490 kPa to 2450 kPa. If the pressure is lower than 490 kPa, the adhesion between the gel electrolyte layer 4 and the active material layers is insufficient such that desired charging/discharging characteristics cannot be achieved. If the pressure is higher than 2450 kPa, the gel electrolyte layer 4 is collapsed and destroyed.

The battery device 6 packed in the exterior film 7 is pressured and heated as the exterior film 7 is sandwiched by a metallic heat block from above and below. In this case, the exterior film 7 is not directly sandwiched by the heat block. It is more preferred that a block of a heat-resistant rubber is arranged between the exterior film 7 and the heat block such that the battery device 6 in the exterior film 7 is pressured and heated through this rubber block. If the battery device 6 is pressured and heated as the exterior film 7 is directly sandwiched by the heat block, the temperature of the heat block is difficult to hold to render the temperature unstable. Moreover, it is difficult to pressure the battery device 6 uniformly. By using the block of the heat-resistant rubber, it is possible to provide for uniform and stable pressuring and heating of the battery device 6.

For activating the gel electrolyte battery 1, prepared as discussed above, it is charged under a pre-set charging condition, and the battery so charged is discharged under a pre-set discharging condition. The charging/discharging conditions may be suitably set depending e.g., on the battery shape or size.

If a gas is yielded during the activation charging, due to solvent decomposition in the gel electrolyte, there is produced a local gap between the active material layers and the gel electrolyte layer 4, such that adhesion between the active material layers and the gel electrolyte layer 4 is lost in this area to deteriorate the battery voltage during storage to increase the rate of rejects thus lowering the production yield. Moreover, lithium ions cannot be migrated sufficiently such that the desired battery capacity cannot be achieved.

So, with the present invention, the gel electrolyte battery 1 from the activation charging and discharging process is pressured from above and below, while the battery device is heated. By pressuring the gel electrolyte battery 1, packed in the exterior film 7, and by heating the battery body, tight adhesion between the gel electrolyte and the electrode can be achieved even if a gap is produced between the gel electrolyte layer 4 and the active material layers due to gas evolution in the course of the activation charging process. By maintaining the tight adhesion between the gel electrolyte layer 4 and the active material layers, the gel electrolyte battery 1 produced may be free of voltage defects, while being of high capacity and superior charging/discharging characteristics.

The heating temperature for the gel electrolyte battery 1 at this time is preferably not less than the sol-gel transition temperature of the sol electrolyte. Specifically, the heating temperature for the battery device is preferably 50° to 105° C. and more preferably 70° to 100° C. if the heating temperature is higher than 105° C., part of the non-aqueous solvent in the gel electrolyte undergoes pyrolysis so that the desired battery capacity cannot be achieved. If the heating temperature is lower than 50° C., the non-aqueous solvent can seep into the non-aqueous electrolytic solution in the active material layers only insufficiently, while it takes much time for the non-aqueous electrolytic solution to seep into the active material layers to lower the production efficiency.

The pressure applied to the battery device 6 is preferably in a range from 490 kPa to 2450 kPa. If the pressure is lower than 490 kPa, the adhesion between the gel electrolyte layer 4 and the active material layers is insufficient such that desired charging/discharging characteristics cannot be achieved. If the pressure is higher than 2450 kPa, the gel electrolyte layer 4 is collapsed and destroyed.

The battery device 6 packed in the exterior film 7 is pressured and heated as the exterior film 7 is sandwiched by a metallic heat block from above and below. In this case, the exterior film 7 is not directly sandwiched by the heat block. It is more preferred that a block of a heat-resistant rubber is arranged between the exterior film 7 and the heat block such that the battery device 6 in the exterior film 7 is pressured and heated through this rubber block. If the battery device 6 is pressured and heated as the exterior film 7 is directly sandwiched by the heat block, the temperature of the heat block is difficult to hold to render the temperature unstable. Moreover, it is difficult to pressure the battery device 6 uniformly. By using the block of the heat-resistant rubber, it is possible to provide for uniform and stable pressuring and heating of the battery device 6.

The gel electrolyte battery 1, prepared in accordance with the present invention, is improved in tight adhesion between the gel electrolyte layer 4 and the active material layers, and hence is of a high capacity and superior in charging/discharging characteristics.

If a gap is produced between the gel electrolyte layer and the active material layers, due to the gas evolved during the activation charging process, it is possible to fill the gap to maintain tight adhesion between the electrolyte layer and the active material layers to increase the production yield. With the gel electrolyte battery 1, prepared as discussed above, lithium migration across the positive and negative electrodes occurs smoothly, thus assuring the high capacity and the superior charging/discharging characteristics. Moreover, the gel electrolyte battery 1, manufactured in accordance with the present invention, is superior in operational reliability under high temperature conditions.

In the above-described embodiment, the strip-shaped positive electrode 2 and the equally strip-shaped negative electrode 3 are layered together and the resulting assembly is coiled longitudinally to produce the battery device 6. The present invention, however, is not limited to this configuration and may be applied to such a case wherein a rectangular positive electrode 2 is layered together with a rectangular negative electrode 3 to provide a layered electrode, or to such a case wherein layered electrodes are collapsed alternately.

The gel electrolyte battery 1 embodying the present invention is not limited to its shape, while it may be of any suitable size, such as thin type or a large size. Moreover, the present invention is applicable both to a primary battery and a secondary battery,

EXAMPLES

The batteries were prepared as indicated below to check the meritorious effect of the present invention.

Example

First, a positive electrode was prepared as now explained. First, 91 parts by weight of LiCoO2, with a mean particle size of 5 μm, as a positive active material, 6 parts by weight of carbon black, as an electrifying agent, and 3 parts by weight of polyvinylidene fluoride, were mixed together to give a positive electrode mixture. This positive electrode mixture was then dispersed in N-methyl pyrrolidone, as a solvent, to form a paste.

The positive electrode mixture paste was then coated evenly on both surfaces of a strip-like aluminum foil, operating as a positive electrode collector, with a thickness of 20 μm, and the resulting mass was dried. The dried mass was compression-molded by a roll press to form a positive active material layer. An aluminum lead was welded to a portion of the positive electrode collector not carrying the positive active material layer to form a positive electrode terminal to complete a positive electrode.

A negative electrode was prepared in the following manner. First, 90 parts by weight of graphite, with a mean particle size of 20 μm, as a negative active material, and 10 parts by weight of polyvinylidene fluoride, as a binder, were mixed together to a negative electrode mixture. This negative electrode mixture was dispersed in N-methyl pyrrolidone as a solvent to produce a paste.

The resulting negative electrode mixture paste was uniformly coated on both surfaces of the strip-like copper foil, as a negative electrode collector, and dried. The dried mass was compression-molded by a roll press to form a negative active material layer. A copper lead was welded to a portion of the negative electrode collector not carrying the negative active material layer to form a negative electrode terminal to complete a negative electrode.

A gel electrolyte layer was then formed on each of the positive electrode and the negative electrode as follows:

In a mixed solvent, containing ethylene carbonate, propylene carbonate and ã-butyrolactone at a weight ratio of 5:3:2, $LiPF_6$ was dissolved at a concentration of 1.2 mol/l to prepare a non-aqueous electrolytic solution. Into this non-aqueous electrolytic solution was then added a copolymer of vinylidene fluoride and hexafluoropropylene, in an amount of 15 wt %, to produce a high molecular electrolytic solution.

The resulting electrolytic solution was then uniformly coated on both surfaces of the positive and negative electrodes by a doctor blade method. The electrolytic solution then was gelated to form a gel electrolyte layer on each of the surfaces of the positive and negative electrodes.

A battery then was assembled as follows: the strip-like positive electrode, carrying the gel electrolyte layers on its both surfaces, and the strip-like negative electrode, similarly carrying the gel electrolyte layers on its both surfaces, were layered together with interposition of a separator, to form a layered mass, which then was coiled longitudinally to from a battery device. The separator used was a porous polyethylene film.

This battery device then was sandwiched by an moisture-proofing exterior film, comprised of a nylon layer 25 μm thick, an Al layer 40 μm thick and a polypropylene film 30 μm thick, layered together. An outer rim of the exterior film was heat-fused under reduced pressure and sealed to tightly seal the battery device in the exterior film. At this time, the positive and negative electrode terminals were sandwiched in the opening part of the exterior film and a polyolefin film was arranged in a contact portion of the exterior film, the positive electrode terminal and the negative electrode terminal.

The battery device, thus sealed in the exterior film, was then pressured at a pre-set pressure and was subjected to a first pressuring/heating processing at a pre-set temperature to complete a gel electrolyte battery 53 mm ×34 mm in size and 3 mm in thickness. The first pressuring and heating processing was carried out as the battery device sealed by the exterior film was clenched by a pair of heating blocks of silicon rubber.

Then, gel electrolyte batteries of samples 1 to 18 were prepared by the same method as discussed above except changing the pressure applied to the battery device sealed in the exterior film and the heating processing temperature to the battery device as indicated in Table 1. Meanwhile, the sample 18 of the battery device was pressured and heated without using a heating block of silicon rubber.

The batteries of the samples 1 to 18 were then tested as to charging/discharging. First, a constant current charging at 500 mA was carried out. When the battery voltage reached 4.2 V, the constant current charging was changed over to constant voltage charging and charging was carried out for 2.5 hours as the voltage of 4.2 V was kept. The constant current discharging then was carried out at 100 mA and finished when the battery voltage fell to 3.0 V.

The discharging capacity was measured at the first cycle time. With the discharging capacity of the sample 4 battery set to 100, the discharging capacity ratio (%) with respect to the battery of the sample 4 was found for each battery.

After repeating the above-mentioned charging/discharging process for ten cycles, the batteries were disintegrated and the appearance of the negative electrode surface was checked visually using a microscope. If lithium precipitation was noticed on the negative electrode surface of a given sample, lithium precipitation was determined to have occurred in that sample. If no lithium precipitation was noticed on the negative electrode surface of a given sample, lithium precipitation was determined not to have occurred in that sample.

For the samples 1 to 18, the discharge capacity ratio and observed results on the negative electrode surface are shown in Table 1 along with the pressure and heating processing temperature as applied to the battery device samples.

be improved, while sufficient discharge capacity was obtained. Moreover, in many cases, lithium precipitation on the negative electrode was not noticed.

As for the heating temperature, seeping of the electrolytic solution into the active material layer was not sufficient for the sample 8 with the heating temperature of 45° C. Also, lithium precipitation on the negative electrode was noticed. With the sample 15, with the heating temperature of 110° C., the exterior film 7 was seen to have swollen, possibly due to partial volatilization of the non-aqueous solvent in the gel electrolyte.

As for the pressure, adhesion between the gel electrolyte layer and the active material layer was not sufficient for the sample 1 with the pressure of 294 kPa (3 kgf/cm$^2$), such that desired charging/discharging characteristics were not achieved. On the other hand, with the sample 7 with the pressure of 2646 kPa (27 kgf/cm$^2$), the gel electrolyte was collapsed and destroyed, whilst internal shorting was noticed and lithium precipitation was seen on the negative electrode.

The battery devices of the samples 2 to 6 and 9 to 14, in which the heating processing temperature for the battery device is 50° C. to 105° C. and the pressure applied to the battery device is 490 kPa (5 kgf/cm$^2$) to 2450 kPa (25 kgf/cm$^2$), exhibited high discharging capacity, while there was no lithium precipitation on the negative electrode.

So, with the heating temperature for the battery device in a range from 50 to 105° C. and the pressure applied to the

TABLE 1

| | heating temperature (° C.) | pressure (kPa) | discharge capacity ratio (%) | Li detection on negative electrode surface | note |
|---|---|---|---|---|---|
| sample 1 | 90 | 294 | 85 | not detected | |
| sample 2 | 90 | 490 | 95 | not detected | |
| sample 3 | 90 | 980 | 99 | not detected | |
| sample 4 | 90 | 1470 | 100 | not detected | |
| sample 5 | 90 | 1960 | 99 | not detected | |
| sample 6 | 90 | 2450 | 98 | not detected | |
| sample 7 | 90 | 2646 | 97 | detected | internal shorting occurred |
| sample 8 | 45 | 1470 | 85 | detected | |
| sample 9 | 50 | 1470 | 93 | not detected | |
| sample 10 | 60 | 1470 | 95 | not detected | |
| sample 11 | 70 | 1470 | 97 | not detected | |
| sample 12 | 80 | 1470 | 98.5 | not detected | |
| sample 13 | 100 | 1470 | 99.5 | not detected | |
| sample 14 | 105 | 1470 | 98.5 | not detected | |
| sample 15 | 110 | 1470 | 97 | not detected | swelling occurred |
| sample 16 | — | — | 79 | detected | |
| sample 17 | 95 | — | 83 | detected | |
| sample 18 | 90 | 1470 | 95 | detected | |

As also shown in Table 1, adhesion between the gel electrolyte layer and the active material layer was not maintained with the battery of sample 16 for which no measures have been taken for the battery device, such that the discharge capacity was lowered. Also, lithium precipitation was noticed on the negative electrode.

For the battery device of sample 17, for which heating was made but pressuring was not made, adhesion was not improved between the gel electrolyte layer and the active material layer, such that a desired discharge capacity was not produced. Also, lithium precipitation was noticed on the negative electrode.

On the other hand, with the battery samples 1 to 15, processed with heating and pressuring, adhesion between the gel electrolyte layer and the active material layer could battery device in a range from 490 kPa (5 kgf/cm$^2$) to 2450 kPa (25 kgf/cm$^2$), permeation of the gel electrolyte into the active material layer is accelerated to improve the adhesion between the active material layer and the gel electrolyte layer. The battery thus fabricated has been shown to exhibit superior charging/discharging characteristics, with smooth lithium migration across the positive and negative electrodes.

With the sample 18, in which the laminated film is directly clenched by the heating block, without interposition of the silicon rubber block, in applying the pressuring and heating to the battery device, it has been shown that, in the absence of the silicon rubber block, uniform pressuring and heating cannot be applied to the battery device, such that the adhesion between the gel electrolyte layer and the active material layer is insufficient, thus permitting lithium to be precipitated on the negative electrode.

So, it has been shown that, by the interposition of the silicon ruber block between the heating block and the laminated film, pressuring and heating can be applied uniformly in stability to the battery device to raise the adhesion between the gel electrolyte layer and the active material layer.

In samples 19 to 23, now explained, batteries were prepared as the non-aqueous solvent components contained in the gel electrolyte were varied. Specifically, the gel electrolyte batteries of the samples 19 to 23 were prepared in the same way as described above except setting the amount of dimethoxyethane (DME) as a low boiling solvent contained in the non-aqueous solvent making up the gel electrolyte layer as shown in Table 2. Meanwhile, the pressure applied to the battery device was 1470 kPa (15 kgf/cm$^2$), with the heating processing temperature being set to 90° C.

The charging/discharging test was conducted on the battery devices of the samples 19 to 23, thus prepared, in the same testing method as discussed above. The discharge capacity ratio and observed results on the negative electrode surface of the batteries of the samples 19 to 23 are shown in Table 2, along with the pressure and heating temperature applied to the battery devices and the content of DME in the electrolytic solution.

TABLE 2

|  | DME content (wt %) | discharge capacity ratio (%) | Li detection on the negative electrode surface | note |
| --- | --- | --- | --- | --- |
| sample 19 | 0.1 | 100 | not detected |  |
| sample 20 | 0.5 | 98 | not detected |  |
| sample 21 | 1.0 | 93 | not detected |  |
| sample 22 | 1.2 | 85 | not detected | swelling occurred |
| sample 23 | 1.5 | 70 | detected | swelling occurred |

As may be seen from Table 2, with the samples 22, 23, in which the amount of the low boiling solvent was set to 1.2 wt % and to 1.5 wt %, respectively, part of the solvent was volatilized off in pressuring and heating the battery device, resulting in swollen exterior films. With the sample 23, lithium was precipitated on the negative electrode.

On the other hand, with the samples 19 to 21 in which the amount of the low boiling solvent was set to 1.0 wt % or less, the battery shape could be maintained, without partial solvent volatilization.

So, it was found that, by setting the content of the low boiling solvent in the gel electrolyte to 1 wt % or less, the exterior film 7 could be prevented from becoming swollen due to volatilization of the low boiling solvent component.

A gel electrolyte battery (sample 24) obtained on processing the sample 4 (gel electrolyte battery in which the heating processing temperature to the battery device is set to 90° C. and the pressuring pressure to the battery device was set to 1470 kPa) with activation charging and discharging, followed by pressuring at 1470 kPa and by second heating processing at 90° C., is hereinafter explained. Meanwhile, the second pressuring and heating for the gel electrolyte battery was performed as the gel electrolyte battery was clenched between a pair of heat blocks via silicon rubber blocks.

As sample 25, a gel electrolyte battery was prepared in the same way as sample 24, except not applying second pressuring and heating to the gel electrolyte battery processed with activation charging and discharging.

Also, as sample 26, a gel electrolyte battery was prepared in the same way as sample 24, except that, instead of applying pressuring and heating using the heat blocks to the battery device, the battery device is kept in a constant temperature vessel for solely performing heating without pressuring in the first pressuring and heating processing.

Figure 6:
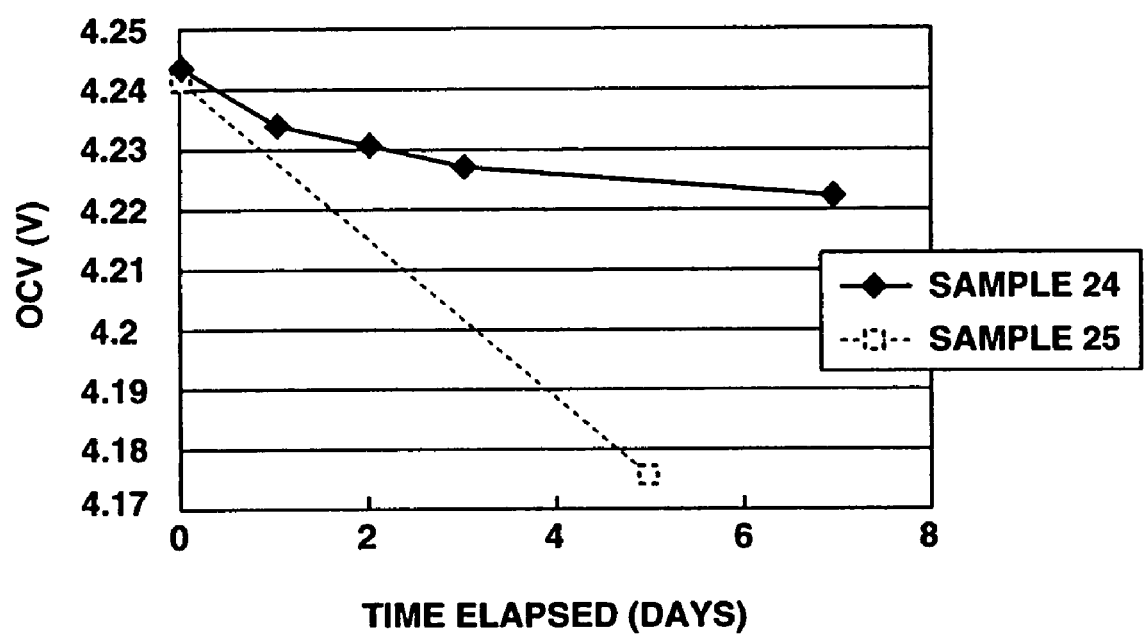
FIG. 6 is a graph showing the relation between the elapsed time and the voltage for batteries of samples 24 and 25.

First, for 100 sample-24 batteries and 100 sample-25 batteries, the yield was evaluated. In evaluating the yield, changes with lapse of time of the open-circuit voltage (OCV) directly as from battery completion were measured and, accepting the batteries which maintained pre-set voltage after lapse of a pre-set time, the rate of the accepted batteries in 100 batteries was checked. FIG. 6 shows the relation between the time elapsed (in days) and the OCV (V) for the batteries of the samples 24 and 25.

As may be seen from FIG. 6, with the battery device of the sample 25, corresponding to the gel electrolyte battery processed with activation charging and discharging but not processed with second pressuring and heating, there was produced a local gap between the gel electrolyte layer and the active material layer such that the adhesion between the gel electrolyte layer and the active material layer could not be raised, with the voltage being lowered significantly with lapse of time, with the yield amounting to only 92%.

On the other hand, the battery of sample 24, corresponding to the gel electrolyte battery processed with activation charging and discharging and also with second pressuring and heating, there was produced no local gap between the gel electrolyte layer and the active material layer, such that adhesion between the gel electrolyte layer and the active material layer could be maintained, with the voltage lowering with lapse of time being smaller by approximately 50 mV than in the battery device of sample 25, with the yield being as high as 96%.

Next, the battery devices of the samples 24 and 25 were put to charging/discharging tests under pre-set charging/discharging conditions to measure the discharging capacity. It was found that, with the battery of sample 24, the discharging capacity was improved by approximately 5% on an average as compared to the battery of sample 25, thus producing a sufficient discharging capacity.

Thus, if a gap is produced between the active material layer and the gel electrolyte layer due to gas evolution in activation charging, this gap can be filled by the pressuring and heating of the gel electrolyte battery after the charging/discharging, thereby improving the adhesion between the active material layer and the gel electrolyte layer for assuring a high battery yield. It was also found that, with the gel electrolyte battery, so prepared, lithium migration across the positive and negative electrodes occurs smoothly to suppress the voltage lowering to display superior charging/discharging characteristics.

Moreover, with the batteries of the samples 24 and 25, heating characteristics in the high voltage charging state were evaluated. In evaluating the heating characteristics, as the battery devices of the samples 24 and 25 were charged to 4.25 V or to 4.40V, the batteries were heated to 135° C., 140° C., 145° C., 150° C. and to 155° C., and the batteries in which the battery function was lost were denoted NG, whilst those which kept the battery functions were denoted OK. The results are shown in Table 3.

TABLE 3

| | voltage (V) | 135° C. | 140° C. | 145° C. | 150° C. | 155° C. |
|---|---|---|---|---|---|---|
| sample 24 | 4.25 | OK | OK | OK | OK | OK |
| | 4.40 | OK | OK | NG | — | — |
| sample 25 | 4.25 | OK | OK | NG | — | — |
| | 4.40 | OK | NG | — | — | — |

It may be seen from the above Table 3 that, with the battery of the sample 24, in which a gel electrolyte battery following activation charging and discharging is processed with the second heating and pressuring, the battery function is maintained up to 150° C. for 4.25V charging and up to 140° C. for 4.40 V charging, whereas, with the battery of the sample 25, not processed with the second heating and pressuring, the battery function is maintained only up to 140° C. for 4.25 V charging and up to 135° C. for 4.40 V charging. It may be seen from this that, by subjecting the gel electrolyte battery following the activation charging and discharging to the second heating and pressuring, high reliability may be maintained in the resulting battery even at elevated temperatures.

The battery capacities of the sample 24 and 26 batteries were compared to one another.

In the sample 24 battery obtained on subjecting a battery device to first pressuring and heating, the force of fusion between the separator, gel electrolyte layer and the active material layer is strong. It is noted that, at this time point, the sample 24 is equivalent to the sample 4. The result is that, if the gas is evolved at the time of activation charging, adhesion between the positive and negative electrodes is substantially maintained, thus yielding a high capacity.

If then the battery is subjected to the second pressuring and heating (sample 24), the gap between the electrodes, produced due to gas evolution, is filled by fusion, thus giving a higher capacity (with the discharge capacity ratio to the discharge capacity of the sample 4 being 101%).

On the other hand, in the sample 26 battery, obtained on subjecting a battery device only to heating processing without applying the pressure to the battery device, with the sample 26 battery being equivalent at this time point to the sample 17 battery, the force of fusion between the separator, gel electrolyte layer and the active material layer is weak. So, the positive and negative electrodes are separated away from each other by the gas evolved at the time of activation charging and hence lithium ions are not intercalated to the negative electrode with the result that no sufficient capacity is obtained. For example, the discharge capacity ratio to the charging capacity of the sample 4 is 83%.

By subjecting the battery to the second pressuring and heating following discharging (sample 26), the spacing between the electrodes, separated from each other by gas evolution, are fused together. Since this intercalates the lithium ions to the negative electrode after re-charging, the capacity is increased. The discharge capacity ratio to the charging capacity of the sample 4 is 98%.

The effect in capacity increase brought about by the second pressuring and heating of the gel electrolyte battery following the activation charging is more outstanding in the case of the battery of the sample 26 not initially processed with the first pressuring and heating. With the sample 24 battery which initially performs first pressuring and heating, the adhesion between the electrodes is inherently strong so that the degree of capacity increase is small.

However, since in general the first pressuring and heating at the outset is more liable to give a gel electrolyte battery of high capacity, heating and pressuring the battery device or the gel electrolyte battery twice before and after the activation charging and discharging may be said to be more effective.

What is claimed is:

1. A method for preparation of a gel electrolyte battery in which a battery device is accommodated in an exterior material, said exterior material comprising a laminated film and sealed therein by heat fusion, said method comprising:
   (a) a battery device preparation step of layering a positive electrode, a negative electrode and a gel electrolyte to form said battery device;
   (b) an accommodating step of accommodating the battery device from said battery device preparation step (a) within said laminated film and sealing said laminated film;
   (c) a first heating step of heating said battery device sealed in said laminated film under a pressured state;
   (d) a charging step of charging the battery device accommodated in said laminated film in said accommodating step (b), wherein said step (d) occurs after step (c);
   (e) a discharging step of discharging the battery device following the charging step (d); and
   (f) a second heating step of heating said battery device under a pressured state, said second heating step (f) occurring after said discharging step (e).

2. The method for preparation of a gel electrolyte battery according to claim 1 wherein, in the second heating step (f) the pressure applied to the battery device is at least 490 and at most 2450 kPa.

3. The method for preparation of a gel electrolyte battery according to claim 1 wherein, in the second heating step (f) the temperature of heating the battery device is at least 50° C. to at most 105° C.

4. The method for preparation of a gel electrolyte battery according to claim 1 wherein, in the second heating step (f) the pressuring and heating are applied through a resin of heat-resistant rubber.

5. The method for preparation of a gel electrolyte battery according to claim 4 wherein the heat-resistant rubber is silicon rubber.

6. The method for preparation of a gel electrolyte battery according to claim 1 wherein the exterior material comprises a laminated film, said laminated film comprising an Al foil and resin layers on both sides of said Al foil.

7. The method for preparation of a gel electrolyte battery according to claim 1 wherein, in said battery device preparation step (a), the gel electrolyte comprises a matrix polymer, a non-aqueous solvent and an electrolyte salt, and wherein a ratio B/A is at most 1 wt %, B being of the amount of the non-aqueous solvent boiling at a temperature of at most 110° C. under ambient pressure, A being the total amount of the non-aqueous solvent contained in the gel electrolyte.

8. The method for preparation of a gel electrolyte battery according to claim 1 wherein, in said battery device preparation step (a), the matrix polymer in a gel electrolyte comprises at least one material selected from the group of polyacrylonitrile, polyethylene oxides, hexafluoropropylene, tetrafluoroethylene, vinyl acetate, methyl methacrylate, butyl methacrylate, methyl acrylate, butyl acrylate, itaconic acid, hydrogenated methyl acrylate, hydrogenated ethyl acrylate, acrylic amide, vinyl chloride, vinylidene fluoride, vinylidene chloride, acrylonitrile-butadiene rubber, acrylonitrile-butadiene styrene resin, acrylonitrile-polyethylene chloride propylene diene styrenic resin, acrylonitrile-vinyl chloride resin, acrylonitrile-methacrylate resin, acrylonitrile-acrylate resin, polyether modified siloxane and copolymers thereof.

9. The method for preparation of a gel electrolyte battery according to claim 1 wherein, in said battery device preparation step (a), a polyolefinic micro-porous separator is arranged, along with the gel electrolyte, between the positive and negative electrodes.

10. The method for preparation of a gel electrolyte battery according to claim 1 wherein, in said battery device preparation step (a), a strip-like positive electrode and a strip-like negative electrode are layered together via a gel electrolyte and coiled longitudinally to form a battery device.

11. The method for preparation of a gel electrolyte battery according to claim 10 wherein, in said battery device preparation step (a), a micro-porous separator is arranged between the strip-like positive electrode made up of the positive active material layer and a gel electrolyte layer formed thereon and the strip-like negative electrode made up of the negative active material layer and a gel electrolyte layer formed thereon.

12. The method for preparation of a gel electrolyte battery according to claim 1 wherein, said battery device preparation step (a), comprises:
 (a1) layering a strip-like positive electrode on each surface of a positive electrode collector, said positive electrode comprising (i) a positive active material layer comprising a lithium compound oxide and (ii) a gel electrolyte layer formed on said positive active material layer, and said positive electrode collector comprising a metal foil;
 (a2) layering a strip-like negative electrode on each surface of a negative electrode collector, said negative electrode comprising (iii) a negative active material layer comprising a material capable of doping/undoping lithium and (iv) a gel electrolyte layer formed on said negative active material layer, and said negative electrode collector comprising a metal foil; and
 (a3) layering together and coiling longitudinally said strip-like positive electrode and the strip-like negative electrode to form a battery device.

* * * * *